(12) United States Patent
Okauchi et al.

(10) Patent No.: US 6,292,272 B1
(45) Date of Patent: *Sep. 18, 2001

(54) IMAGE SENSOR

(75) Inventors: Shigeki Okauchi, Kodaira; Hitoshi Nabetani, Yokohama; Taro Murakami, Musashino, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/690,812

(22) Filed: Aug. 1, 1996

(30) Foreign Application Priority Data

| Aug. 3, 1995 | (JP) | 7-198673 |
| Aug. 3, 1995 | (JP) | 7-198674 |
| Nov. 17, 1995 | (JP) | 7-299794 |

(51) Int. Cl.⁷ .................................................. H04N 1/04
(52) U.S. Cl. .................... 358/471; 358/906; 358/909.1; 358/474; 358/442; 348/552
(58) Field of Search .................. 358/474, 471, 358/473, 400, 500, 505, 906, 909.1, 909.5, 442; 348/333, 334, 207, 552, 373, 375, 376, 220, 221; 395/892, 893

(56) References Cited

U.S. PATENT DOCUMENTS

| 5,438,359 | 8/1995 | Aoki ..................................... 348/207 |
| 5,468,952 | 11/1995 | Alexander . |
| 5,475,441 | 12/1995 | Parulski et al. ..................... 348/552 |
| 5,506,617 | 4/1996 | Parulski . |
| 5,521,369 | 5/1996 | Kumar . |
| 5,644,410 * | 7/1997 | Suzuki et al. ....................... 358/473 |
| 5,666,159 | 9/1997 | Parulski . |
| 5,708,515 * | 1/1998 | Nishiura ................................ 358/474 |
| 5,708,853 | 1/1998 | Sanemitsu . |

FOREIGN PATENT DOCUMENTS

| 0 581 286 | 2/1994 | (EP) . |
| 0 581 286 A1 | 2/1994 | (EP) . |
| 0 683 596 | 11/1995 | (EP) . |
| 0 683 596 | 11/1996 | (EP) . |

(List continued on next page.)

OTHER PUBLICATIONS

"PCMCIA Video Camera for Mobile Computing,," Electronic Engineering, vol. 66, No. 814, p. 22, Oct. 1994.

(List continued on next page.)

Primary Examiner—Cheukfan Lee
(74) Attorney, Agent, or Firm—Morgan & Finnegan LLP (57) ABSTRACT

A card-type image sensor used upon being inserted into the card slot of an external device such as a computer includes an image sensor head having image sensing device such as a CCD. A control panel having a zoom switch and a focus switch is provided on the image sensor head, which is rotatably attached to the rotary support portion of a card body having a main board. The control panel is disposed in a plane perpendicular to the axis of rotation of the image sensor head so that no portion of the image sensor head will project from below the lower side of the card body when the image sensor head is turned. In addition, a desk or the like will not interfere with the image sensor head when the head is turned. The results is improved operability. Further, the card body is provided with a finger catch used when the image sensor is detached from the external device. A frame wall, a frame portion and upper and lower covers are provided so as cover a main board, and a rib is provided between frame wall and the frame portion. There is less likelihood that image sensor will malfunction even if the image sensor head is detached by pulling it out of the external device without pressing an eject button.

19 Claims, 5 Drawing Sheets

FOREIGN PATENT DOCUMENTS

| | | |
|---|---|---|
| 2289555 * | 11/1995 | (GB) . |
| 1106581 * | 8/1989 | (JP) . |
| 04295886 * | 3/1993 | (JP) . |
| 6-178177 | 6/1994 | (JP) . |
| 6-276420 | 9/1994 | (JP) . |
| 7-121147 | 5/1995 | (JP) . |
| WO 94/14274 | 6/1994 | (WO) . |
| WO 96/07269 A1 | 3/1996 | (WO) . |

OTHER PUBLICATIONS

English translation of Patent Abstracts of Japan vol. 017, No. 511 (E–1432), Sep. 14, 1993 and JP 05 130475 A (Sony Corp), May 25, 1993.

English translation of Patent Abstracts of Japan vol. 017, No. 094 (E–1325), Feb. 24, 1993 and JP 04 286474 A (Canon Inc), Oct. 12, 1992.

English translation of Patent Abstracts of Japan vol. 017 No. 85 (E–1322), Feb. 19, 1993 and JP 04 281678 A (Canon Inc), Oct. 7, 1992.

English translation of Patent Abstract s of Japan vol. 095, No. 008, Sep. 29, 1995 and JP 07 121147 A (Hitachi Ltd), May 12, 1995.

Patent Abstracts of Japan, vol. 95, No. 005, May 12, 1995 (published by EPO).

"PCMCIA Video Camera for Mobile Computing," Electronic Engineering, vol. 66, No. 814, Oct. 1, 1994.

English language abstracts of Japanese Patent Applications Nos. 6–178177, 6–276420 and 7–121147.

"Integrated Computer and Camera," IBM Technical Disclosure Bulletin vol. 37, No. 10, Oct. 1, 1994.

* cited by examiner

PRIOR ART

IMAGE SENSOR

BACKGROUND OF THE INVENTION

This invention relates to a card-type image sensor inserted into the card slot of a computer or the like for introducing image into the computer.

Computers are becoming increasingly small in size and even computers as small as one's hand have made their appearance. Since the limitation upon the size of the recording medium in these small-size computers is greater than in the case of desktop computers, small-size computers are provided with a card slot into which a PCMCIA card can be directly inserted instead of a floppy disk drive.

Usually a memory card or fax card is capable of being inserted into the card slot so that a variety of applications can be accommodated. Further, a card-type image sensor the distal end of which is provided with a camera head for introducing an image has recently been proposed, as illustrated in the specification of Japanese Patent Application Laid-Open No. 7-121147.

Figure 5:
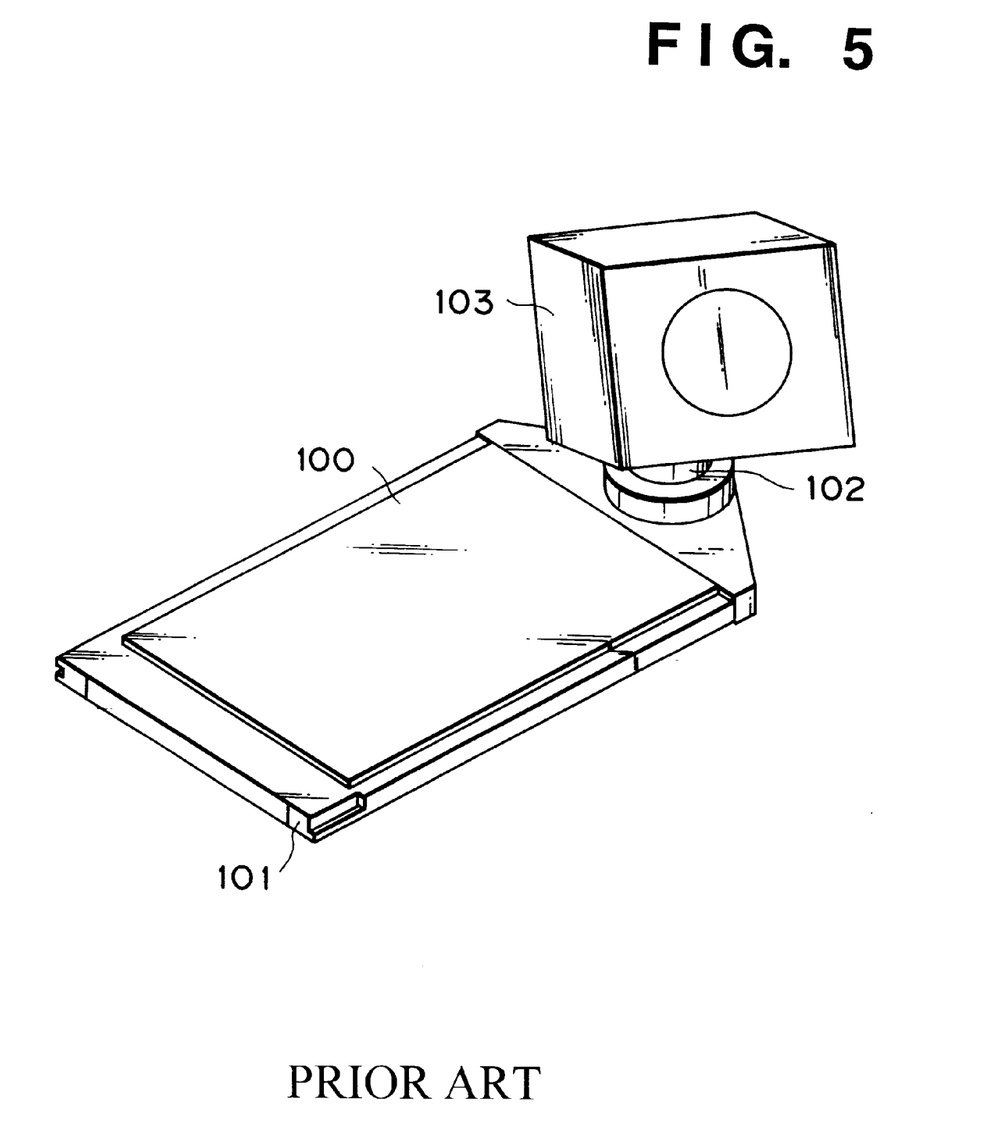
FIG. 5 is a perspective view showing the external appearance of a card-type image sensor according to the prior art.

FIG. 5 is a perspective view illustrating the general construction of such a card-type image sensor. The image sensor includes a main body comprising a signal processor 100 arranged on a board, a card connector 101 provided on the edge at one end of the board and a support portion 102 provided on the other end of the board. A camera head 103 is supported on the support portion 102 so as to be free to rotate.

Video cameras, which are electronic devices for handling images, now feature excellent picture quality and functionality by virtue of a variety of technical advances. Hence it is only a matter of time before card-type image sensors are also furnished with full functionality. In such case the functions of the image sensor will be assigned to the keys on the computer keyboard and the camera will be capable of being controlled or operated by operating the keys.

However, if it is attempted to accommodate an increase in the number of functions of a conventional card-type image sensor solely by keyboard operation, there is the danger that such operation will become increasing complicated and result in a less user-friendly environment.

Another problem in the prior art mentioned above is that a desk or the like may interfere with the image sensor head when the head is turned, depending upon the way the rotary shaft of the head is set in position.

Further, when the camera unit having the foregoing construction is loaded in and unloaded from a computer, a connection is made by pushing the card into the computer by hand to insert the card and the card can be detached from the computer by pressing an eject button on the computer body when the card is extracted.

However, with the image sensor according to the prior art described above, the image sensing portion protrudes from the computer body. Consequently, the camera head may be pulled out of the computer body without the eject button being pressed. As a result, there is the possibility that the device will be caused to malfunction.

SUMMARY OF THE INVENTION

A first object of the present invention is to provide an easy-to-operate card-type image sensor having a rotatable image sensor head, in which the camera head is provided with a control panel by which the image sensor is operated.

A second object of the present invention is to provide a card-type image sensor made easy to operate by adopting a configuration for the image sensor head such that the card will not project from the bottom side of the main body of the sensor when the head is rotated.

A third object of the present invention is to provide a card-type image sensor which will not readily be caused to malfunction even when the camera head is separated from the computer body by pulling the image sensor head without operating the eject button.

According to a first aspect of the present invention, a card-type image sensor comprises an image sensor head constituted by image sensing means for photoelectrically converting a light image and producing an electrical image information signal, a control panel provided on the image sensor head for changing image sensing conditions of the image sensing means, and a main body constituted by an image processor for processing the image information signal and a connector portion for outputting the image signal, which has been processed by the signal processor, to an external device, wherein the image sensor head is capable of turning relative to the main body and the control panel is disposed in a plane perpendicular to the axis of rotation of the image sensor head. As a result of this configuration, the image sensor is easy to operate as the control panel is not hidden even when the image sensor head is turned.

According to a second aspect of the present invention, a card-type image sensor comprises an image sensor head constituted by image sensing means for photoelectrically converting a light image and producing an electrical image information signal, and a generally card-shaped main body constituted by a signal processor for processing the image information signal and a connector portion for outputting the image signal, which has been processed by the signal processor, to an external device, wherein the image sensor head is capable of turning relative to the main body and has an axis of rotation extending longitudinally of the main body, and no portion of the image sensor head projects from below a lower side of the main body when the image sensor head is turned. As a result of this configuration, the image sensor head can be operated without being interfered with by a desk or the like even if the card slot of the computer to which the image sensor is connected is provided very close to the bottom of the computer.

According to a third aspect of the present invention, a card-type image sensor comprises image sensing means for photoelectrically converting a light image and producing an electrical image information signal, an image processor for processing the image information signal, a connector portion for outputting the image signal, which has been processed by the signal processor, to an external device, an image sensor head constituted by the image sensing means, and a main body constituted by the signal processor and connector portion, wherein the main body is provided with a finger catch. As a result, if the operator forgets to press an eject button on the computer and grasps the camera unit in an effort to pull the image sensor from the computer, the operator's finger engages the finger catch during the pulling operation and allows the image sensor to be pulled out. This greatly reduces the possibility that the image sensor will be damaged.

In an embodiment, the finger catch has a size equal to or greater than that of the image sensor head. This makes it easier for the operator's finger to engage the finger catch in the pulling operation, thereby reducing further the possibility that the image sensor will be damaged.

According to a fourth aspect of the present invention, a card-type image sensor comprises image sensing means for photoelectrically converting a light image and producing an electrical image information signal, an image sensor head constituted by the image sensing means, a signal processor for processing the image information signal, a connector portion for outputting the image signal, which has been processed by the signal processor, to an external device, a main board on which the signal processor and connector portion have been mounted, a generally frame-shaped frame so adapted as to cover the main board, a metal cover so disposed as to embrace the main board and the frame, and a main body constituted by the main board, the frame and the cover, wherein a support portion for supporting the image sensor head is constructed as an integral part of the frame. As a result of this configuration the rigidity of the frame is increased. If the operator forgets to press an eject button on the computer and grasps the camera unit in an effort to-pull the image sensor from the computer, the high rigidity of the sensor greatly reduces the possibility that the image sensor will be damaged.

In an embodiment, the support portion and the frame are connected by a rib, thereby increasing further the rigidity of the frame. If the operator forgets to press an eject button on the computer and grasps the camera unit in an effort to pull the image sensor from the computer, the higher rigidity of the sensor greatly reduces further the possibility that the image sensor will be damaged.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

Figure 1:
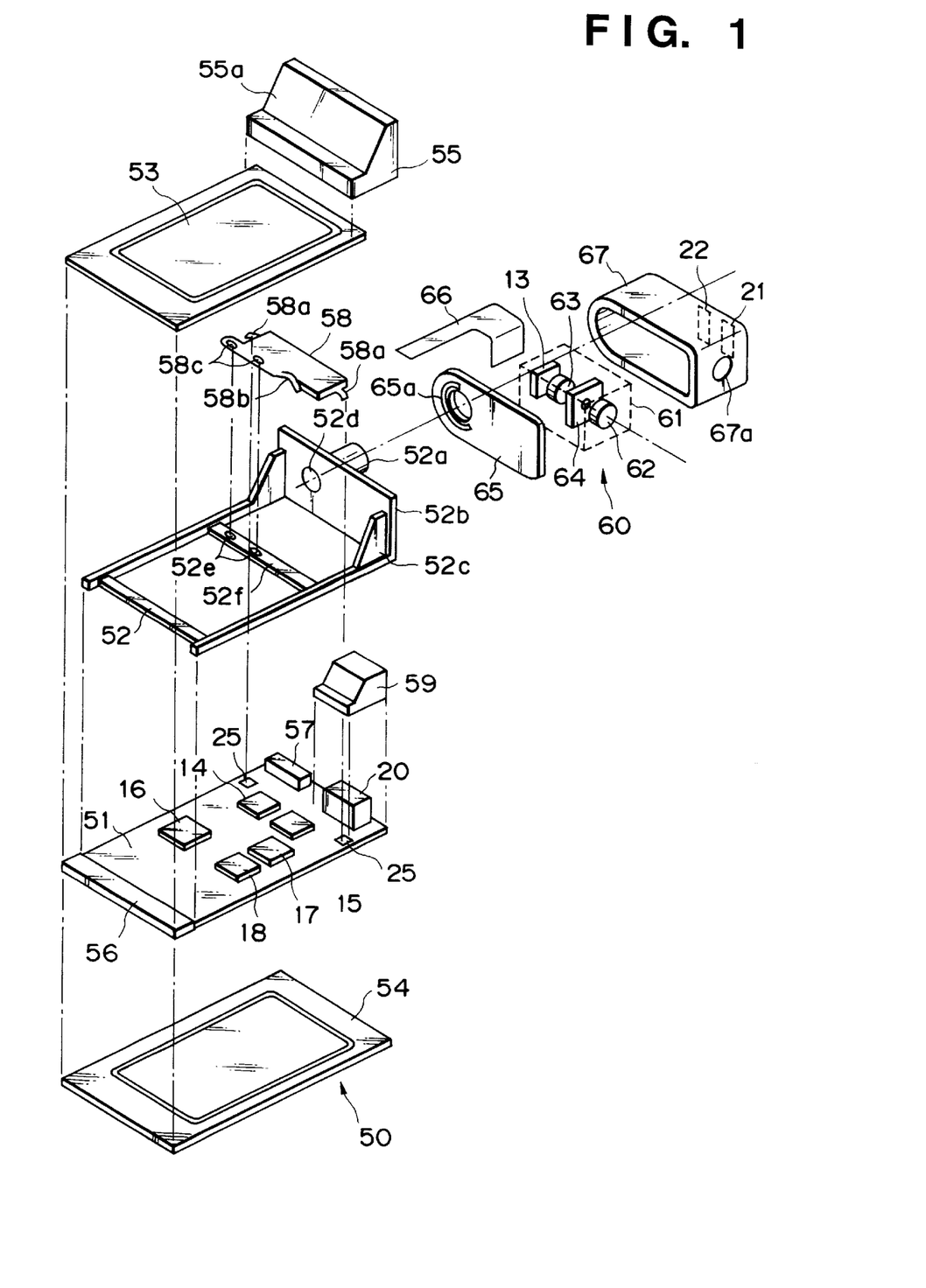
FIG. 1 is an exploded perspective view showing the structure of a card-type image sensor according to an embodiment of the invention.
Figure 2:
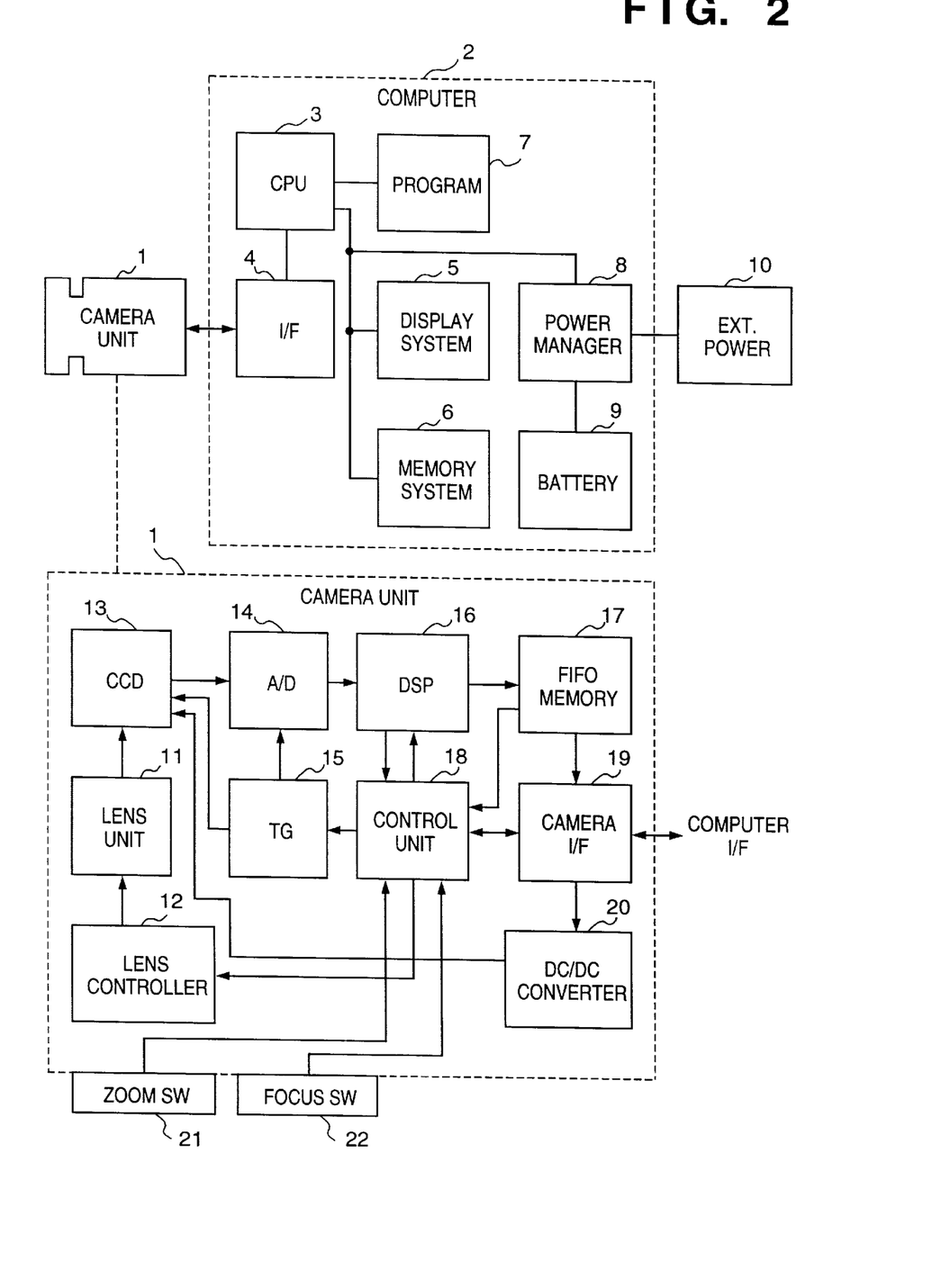
FIG. 2 is a block diagram showing the architecture of the circuitry in the card-type image sensor of FIG. 1.
Figure 3A:
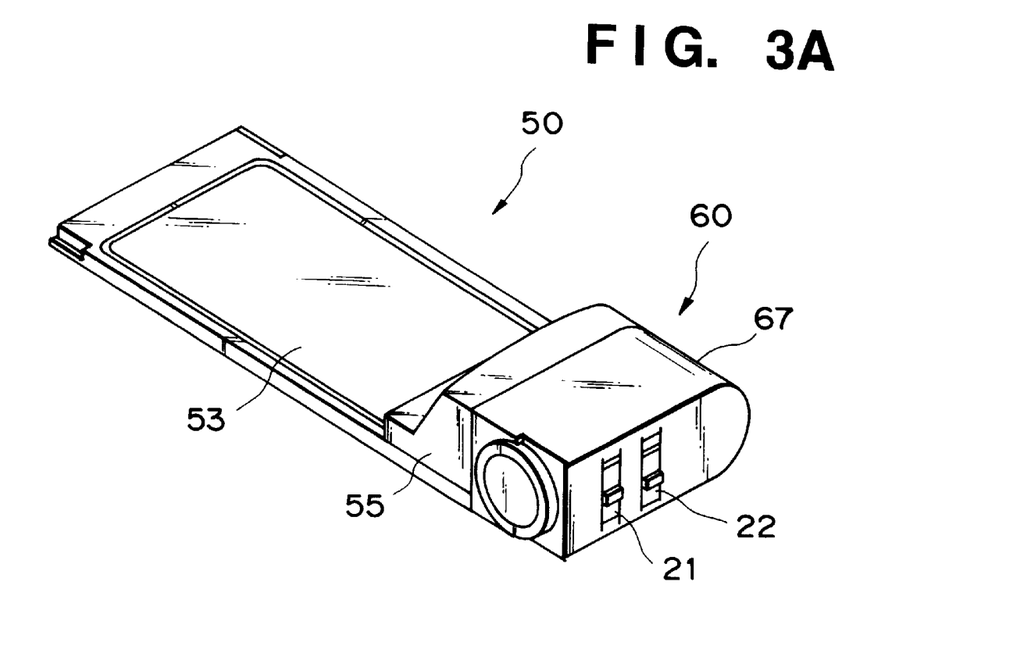
FIGS. 3A and 3B are perspective views showing the external appearance of the card-type image sensor shown in FIG. 1.
Figure 3B:
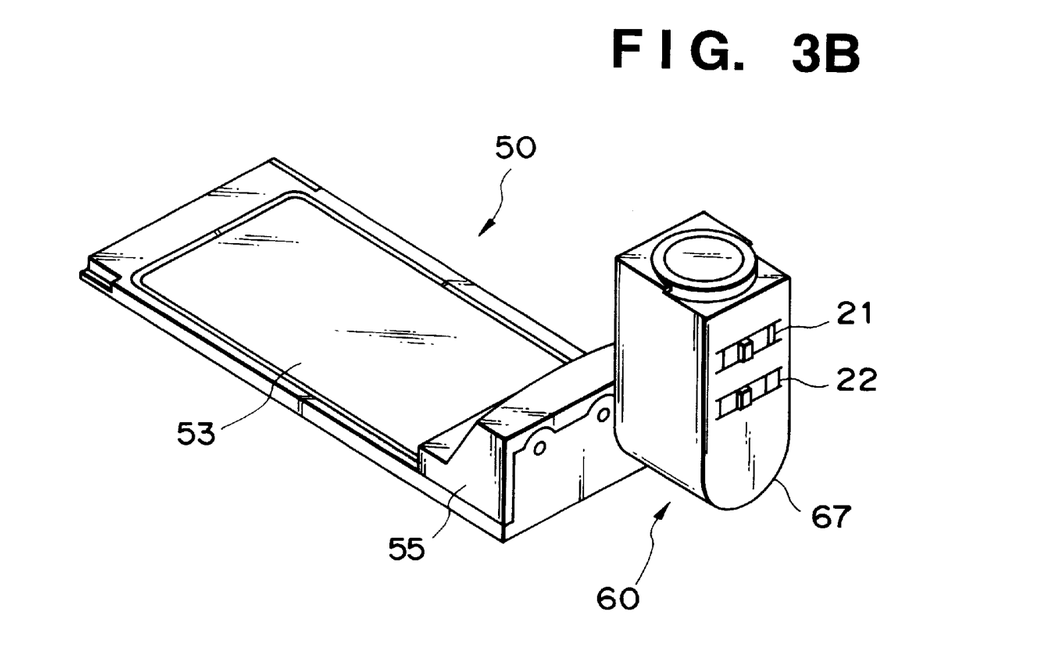

A card-type image sensor according to an embodiment of the invention will be described below. FIG. 1 is an exploded perspective view showing the structure of the card-type image sensor, FIG. 2 is a block diagram showing the architecture of the circuitry in the card-type image sensor of FIG. 1, and FIGS. 3A and 3B are perspective views showing the external appearance of the card-type image sensor. FIGS. 3A and 3B illustrate different orientations of an image sensor head.

Though the details will be described below, the card-type image sensor has an analog circuit component (an electrical component) and a digital circuit component mounted separately on the circuit board. The analog circuit component is placed at a position remote from a connector for connecting the image sensor to the external device and is protected by a shielding plate.

The card-type image sensor further includes electrically conductive members (conductors for covering at least part of a case) which cover part of the above-mentioned components, and a frame which supports the covers and the circuit board. The electrically conductive members are electrically connected to the shielding plate, and the shielding plate is electrically connected to a prescribed terminal (a ground pattern) of the circuit board.

The circuitry will be described first. Shown in FIG. 2 are a camera unit 1, which corresponds to the inventive card-type image sensor of the internally provided with an optical system and a signal processing system, and a computer 2, which is an external device. The computer 2 includes a CPU 3, an interface (I/F) 4 for connecting the card-type image sensor 1 to the computer 2, a display system 5, a memory system 6, a rewritable operating program 7 for controlling the computer 2, a power manager system for managing the power of the computer 2 and a battery 9. An external power supply 10 is capable of supplying power to the computer 2.

The internal architecture of the camera unit 1 enclosed by dashed line in FIG. 2 will be described next. As shown in FIG. 2, the camera unit 1 includes a lens unit 11 having a zoom lens, a focusing lens and a diaphragm, and a lens controller 12 for driving the lens. The lens controller 12 includes a well-known automatic focusing device, automatic exposure device and automatic vibration preventing device (a device which prevents blurring caused by hand movement). The card-type image sensor further includes a CCD (image sensing device) 13 for photoelectrically converting a light image and producing an electrical image information signal, an A/D converter 14 for converting the analog image information signal to a digital signal, a timing generator (TG) 15 which generates a timing signal for control purposes, a digital signal processor (DSP) 16 for processing the digital image information signal and producing a predetermined image signal, a FIFO memory 17, a control unit 18 for overall control, and an interface (camera I/F) 19 for the purpose of external connection. The interface 19 serves as a connecting portion for outputting the above-mentioned image signal.

The card-type image sensor further includes a DC/DC converter 20 for converting the power supply voltage, which is supplied by the computer 2, to an optimum voltage to drive the CCD 13, a zoom switch (zoom SW) 21 and a focus switch (focus SW) 22. The output sides of the switches 21, 22 are connected to the control unit 18. This makes possible lens control conforming to the operation of the switches 21, 22.

The image sensing system of this embodiment is configured to include the camera unit 1 and computer 2, which are capable of being separated from each other. More specifically, the interface 4 is constituted by a PCMCIA card slot. Part of the camera unit 1 has a shape identical with that of a PCMCIA card. When the camera unit 1 and computer 2 have been connected together, photography is possible in a state in which the lens unit projects from the computer 2. The camera unit 1 and computer 2 can be separated from each other by pressing an eject button (not shown) provided on the computer 2.

Figure 4:
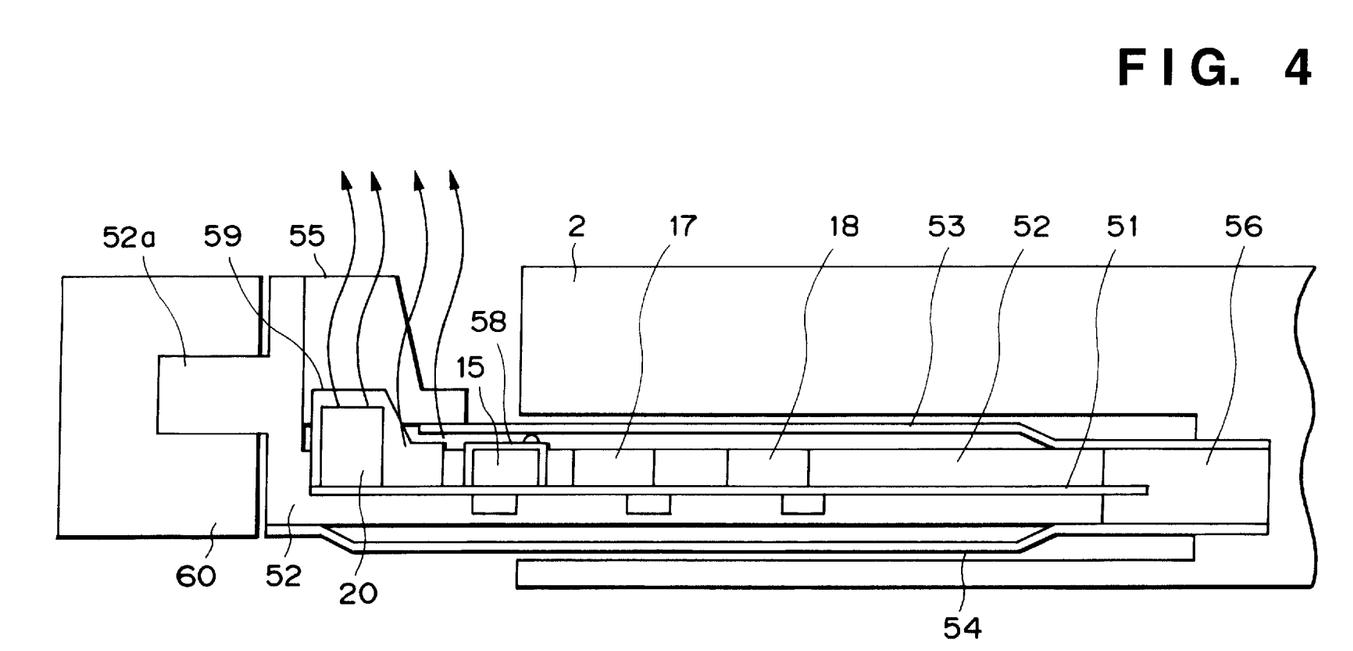
FIG. 4 is a sectional view showing the card-type image sensor of FIG. 1 inserted into the slot of a computer.

The specific structure of the camera unit 1 will now be described with reference to FIGS. 1, 3 and 4. Components identical with those shown in FIGS. 1 and 4 are designated by like reference characters. FIGS. 3 and 4 are perspective views illustrating the external appearance of the image sensor. FIG. 4 shows the camera unit 1 inserted into a slot in the computer 2. The camera unit 1 is constituted by a generally card-shaped card body 50 and an image sensor head 60 having the CCD 13.

The card body 50 will be described first.

A main board 51 is soldered to the terminals of a connector 56. The main board 51 mounts analog circuitry, namely the A/D converter 14 and the timing generator 15, digital circuitry, namely the digital signal processor (DSP) 16, FIFO memory 17 and control unit 18, the DC/DC converter 20 and a flexible connector 57. The DC/DC converter 20 is mounted on the board. As shown in FIG. 1, the analog and digital circuit portions are dispersed on the board, with the analog circuits being mounted at positions farthest from the connector 56 for connection to the external device.

A card frame 52 has the connector 56 connected to it and holds the main board 51. The card frame 52 has a substantially frame-shaped structure and, on the side opposite that on which the connector 56 is disposed, is integrally provided with a frame wall 52b having an upstanding support 52a for rotatably supporting the image sensor head 60. The frame portion of the card frame 52 has rib portions 52c for both sides of the frame wall 52b. Further, the rotary support 52a is formed to have a passageway 52d through which a flexible circuit board 66, described later, is passed. Projections (fixing members) 52e for fixing a shielding plate 58, described later, are provided on a support portion 52f which supports the main board 51.

Covers 53, 54 are made of metal and sandwich the main board 51 and card frame 52 from above and below and are attached to the card frame 52 by bonding or by being joined mechanically. The covers serve also as shields against noise and the like. The outer geometry of the card portion is decided by the covers 53, 54 and part of the card frame 52 and allows the card to be inserted into the card slot of the computer 2.

A case 55 is secured to the card frame 52 as by tightening a screw and has a finger catch 55a. Components having a comparatively large height, such as the DC/DC converter 20 and flexible connector 57, are placed on the main board 51 at locations corresponding to the finger portion 55a.

The finger catch 55a has a thickness greater than that of the card body 50 constituted by the card frame 52 and the covers 53, 54 and, in terms of dimensions, has a size equal to or greater than that of the image sensor head 60. In other words, the finger catch 55a is substantially that same size as the image sensor head 60 in terms of width and height. It is particularly preferred that the dimensions of the image sensor head 60 be smaller than those of the finger catch 55a.

The shielding plate 58, which covers the A/D converter 14 and timing generator 15 constructing the analog circuitry, has holes 58c into which the projections 52e of the card frame 52f are fitted in order to position the card frame, and a resilient portion 58a for connecting the circuit board. The resilient portion 58a contacts the ground pattern 25 provided on the main board 51, whereby the main board 51 and shielding plate 58 are electrically connected. The shielding plate 58 has a resilient portion 58b for establishing an electrical connection with the covers 53, 54.

A shielding case 59 made of metal covers and shields the DC/DC converter 20 and is placed at a position which corresponds to the circuitry of the DC/DC converter 20. Further, part of the shielding case 59 is situated between the main board 51 and cover 53 and is capable of contacting the cover 53.

The image sensor head 60 will now be described.

An optical image sensing unit 61 is provided with a zoom lens 62 and focusing lens 63 of the lens unit 11 capable of being moved along the optic axis, and a diaphragm unit 64 is disposed between the zoom lens 62 and focusing lens 63. The optical image sensing unit 61 is provided with the CCD 13 at a position at which an image is formed by the light that has passed through the focusing lens 63 and diaphragm unit 64. Furthermore, the optical image sensing unit 61 includes a motor for driving the zoom lens, a motor for driving the focusing lens and an IG meter. The zoom lens 62, focusing lens 63 and diaphragm unit 64 are driven by the lens controller 12.

A rotary plate 65, which has the optical image sensing unit 61 attached thereto, is provided so as to be free to turn relative to a rotary support portion 52a of the card frame 52. Further, the side of the rotary plate 65 facing the card frame 52 is provided with a groove 65a. A projection (not shown) provided on the side of the frame wall 52b facing the rotary plate 65 mates with the groove 65a. The projection on the card frame 52 moves in the groove 65a in conformity with rotation of the rotary plate 65, as a result of which the image sensor head 60 rotates. In this embodiment, the optic axis may be rotated through 180° from the horizontal attitude to the horizontal attitude.

The flexible board 66 sends the output of the CCD 13 to the main board 51 on the side of the main body and sends lens and diaphragm drive instructions from the side of the main body to the side of the image sensor head. The flexible board 66 is passed through the passageway 52d of the rotary support portion 52a protruding from the card frame 52 toward the image sensor head 60 and the end of the board 66 is connected to the flexible connector 57 on the main board 51 through a cut-away portion of the card frame 52.

An image sensor case 67 forms the case of the image sensor head 60 and is provided with an opening 67a at a location corresponding to the optic axis. The case 67 is provided with the zoom switch 21 and focus switch 22 in a plane perpendicular to the axis of rotation. Switch status is transmitted to the side of the main body via the flexible board 66.

If the angle of view at which an image is captured is changed, the desired angle of view is set by operating the zoom switch 21. The focus switch 22 usually is not used because the camera ordinarily operates in the autofocus mode. The switch 22 is used when focus is capable of being set manually by the computer.

The center of rotation of the image sensor head 60 is decided in such a manner that the image sensor head 60 will not protrude from the lower side of the card body 50 when the head 60 is turned. More specifically, if we let R represent the distance from the bottom side of the card body to the center of rotation, the shape of the image sensor head 60 on the side opposite the opening 67a is given such dimensions that the distance from the center of rotation will not exceed R (see FIGS. 3A and 3B).

When the camera unit 1 is inserted into the card slot of the computer 2 and the camera unit 1 is supplied with electric power, the image of a subject formed on the CCD 13 through the lens unit 11 is converted to digital data by the A/D converter 14. These digital data are subjected to digital processing by the signal processor 16, the processed data are recorded temporarily in the FIFO memory 17 and then the data are transmitted to the computer 2 through the interface 19 in the order in which they were recorded. At this time the interface 19 on the camera side is connected to the interface 4 on the computer side.

Image data are obtained from the CCD 13 and A/D converter 14 using timing pulses sent by the timing generator 15. The intervals of the timing pulses sent by the timing generator 15 are controlled by the control unit 18.

Focus control and exposure control is performed by the control unit 18 on the basis of the signal representing the captured image, and the captured-image data are sent to the computer 2 via the interface 4 so that the data can be displayed on the display system 5 or recorded in the memory system 6.

Thus, in a case where the image sensor head 60 is capable of being turned relative to the card body 50, the fact that the zoom switch 21 and focus switch 22 are disposed in a plane perpendicular to the axis of rotation of the head 60 means that the switches 21, 22 will not be hidden regardless of how the head 60 is rotated. This assures easy operation.

Further, in a case where the axis of rotation of the image sensor head 60 extends longitudinally of the card body 50, no portion of the image sensor head 60 will project from below a lower side of the card body 50 when the image sensor head 60 head has been turned. As a result of this configuration, the image sensor head 60 can be operated without being interfered with by a desk or the like even if the card slot of the computer 2 to which the camera unit 1 is connected is provided very close to the bottom of the computer. Since interference between image sensor head 60 and the desk or the like is actually prevented, the object of the invention is attained by holding the amount of projection to the minimum.

When the camera unit 1 is to be separated from the computer 2, separation is performed by pressing an eject button, which is not shown. If the operator forgets to press the eject button and grasps the camera unit 1 in an effort to pull the camera unit from the computer, the operator's finger engages the finger catch 55a so that the camera unit can be pulled out. This greatly reduces the possibility that the camera unit 1 will be damaged.

Further, the frame wall portion 52b of the card frame 52 is formed as an integral part of the card frame 42 and the rib 52e is provided on the frame 52c. Therefore, even though the image sensor head 60 is in a rotatable state, the high rigidity of the sensor greatly reduces the possibility that the image sensor will be damaged.

Furthermore, the circuitry of the computer 2 is driven at a high frequency. The circuitry peripheral to the connector 56 connected directly to the card slot of the computer 2 is readily susceptible to the effects of noise since it is disposed at a position close to the circuitry driven at high frequency. In this embodiment, however, the circuitry on the main board 51 is divided into analog and digital circuits and the analog circuitry, which is susceptible to the effects of noise, is disposed at a position remote from the connector 56 so that the effects of noise can be minimized. Furthermore, since the analog circuitry is provided with the shielding plate 58, shielding against noise can be achieved with assurance.

Further, the shielding plate 58 is formed from a resilient member and the main board 51 is grounded utilizing the resiliency of shielding plate. As a result, the main board 51 and shielding plate 58 can be electrically connected reliably without being soldered together. Since the metal plate (cover) and main board 51 are resiliently connected, a coil spring is no longer required, thereby facilitating the assembly operation.

In the embodiment described above, the configuration of the image sensor head 60 is such that the image sensor head 60 rotates in a plane perpendicular to the direction in which the card is inserted into the card slot. However, the same effects are obtained even in an arrangement in which the image sensor head 60 rotates in a plane parallel to the direction in which the card is inserted into the card slot.

Further, in the illustrated embodiment, the optical image sensing unit 61 has a zoom lens and an autofocus lens and is capable of performing an automatic exposure operation. However, in order to reduce power consumption, an arrangement which relies upon a single focal point, manual focusing and a manually operation diaphragm may be adopted. In such case the image sensor head 60 must be provided with the control panel. Providing the control panel in a plane perpendicular to the axis of rotation greatly facilitates operability. If this is done, the lens controller 12 may be dispensed with as well as signal lines necessary for controlling the lenses and the like. This makes it possible to reduce the size of the flexible board 66 and to lower cost.

As many apparently widely different embodiments of the present invention can be made without departing from the spirit and scope thereof, it is to be understood that the invention is not limited to the specific embodiments thereof except as defined in the appended claims.

What is claimed is:

1. An image sensor comprising:
   an image sensor head having image sensing means for photoelectrically converting a light image and producing an electrical image information signal;
   a control panel provided on said image sensor head for setting image sensing conditions of said image sensing means; and
   a main body having an image processor for processing the image information signal to produce a predetermined image signal, and a connector portion for outputting the image signal to an external device;
   wherein said image sensor head is rotatable relative to said main body and said control panel is disposed in a plane substantially perpendicular to the axis of rotation of said image sensor head.

2. The image sensor according to claim 1, wherein the axis of rotation is substantially parallel to a direction in which said connector portion is inserted into the external device.

3. The image sensor according to claim 1, wherein the main body includes a PCMCIA card.

4. The image sensor according to claim 1, wherein said control panel includes a zoom switch.

5. The image sensor according to claim 1, wherein said control panel includes a focus switch.

6. An imaging sensor comprising:
   an image sensor head having image sensing means for photoelectrically converting a light image and producing an electrical image information signal; and
   a substantially card-shaped main body comprising a signal processor for processing the image information signal to produce a predetermined image signal, and a connector portion for outputting the image signal to an external device;
   wherein said image sensor head is rotatable relative to said main body and has an axis of rotation extending longitudinally of said main body, and no portion of said image sensor head projects from below a lower side of said main body, based upon the axis of rotation, dimensions of said image sensor head and range of rotation of said image sensor head, when said image sensor head is turned, the axis of rotation of said image sensor head being substantially parallel to a direction in which said connector portion is inserted into the external device.

7. The image sensor according to claim 6, wherein the main body includes a PCMCIA card.

8. The image sensor according to claim 6, wherein the range of rotation of said image sensor head is determined by a projection and a guide groove, one of them provided to said image sensor head and another of them provided to the main body.

9. An image sensor comprising:

image sensing means for photoelectrically converting a light image and producing an electrical image information signal;

an image sensor head having said image sensing means;

a signal processor for processing the image information signal to produce a predetermined image signal;

a connector portion for outputting the image signal to an external device; and a main body having said signal processor and said connector portion, wherein said main body has a card-shaped structure insertable into a slot of the external device and a finger catch rigidly formed on an end portion of the card-shaped structure and projecting out of the slot of the external device said finger catch having a thickness greater than that of said card-shape structure, and said image sensor head is rotatively mounted to said finger catch.

10. The image sensor according to claim 9, wherein said finger catch is formed to have a size equal to or greater than that of the image sensor head.

11. The image sensor according to claim 9, wherein the main body includes a PCMCIA card.

12. The image sensor according to claim 5, wherein said finger catch is spaced from said external device, when said image sensor is inserted into the slot of the external device.

13. An image sensor comprising:

image sensing means for photoelectrically converting a light image and producing an electrical image information signal;

an image sensor head having said image sensing means;

a signal processor for processing the image information signal to produce a predetermined image signal;

a connector portion for outputting the image signal to an external device;

a board on which the signal processor and connector portion have been mounted; and a frame-shaped frame covering said board wherein a support portion for supporting said image sensor head is formed as an integral part of said frame.

14. The image sensor according to claim 13, wherein said frame formed to include said support portion as an integral part thereof is provided with a rib.

15. An image sensing system comprising a card-type image sensor having a rotatable image sensor head and a connector portion, and an external image processing apparatus capable of being detachably connected to said connector portion, wherein operating means for operating said image sensor head is disposed in a plane substantially perpendicular to said card-type image sensor on a side thereof opposite that inserted into said image processing apparatus.

16. The image sensing system according to claim 15, wherein said connector portion includes a PCMCIA card.

17. The image sensing system according to claim 15, wherein said operating means includes a zoom switch.

18. The image sensing system according to claim 15, wherein said operating means includes a focus switch.

19. An image sensing system comprising a card-type image sensor having a rotatable image sensor head and a connector portion, and an external image processing apparatus capable of being detachably connected to said connector portion, wherein axis of rotation, dimensions and range of rotation of said image sensor head are set in such a manner that part of said image sensor head will reside above a lower side of said image processing apparatus when said image sensor head has been rotated, the axis of rotation of said image sensor head being substantially parallel to a direction in which said connector portion is inserted into the external image processing apparatus.

* * * * *

UNITED STATES PATENT AND TRADEMARK OFFICE
CERTIFICATE OF CORRECTION

PATENT NO.      : 6,292,272 B1
DATED           : September 18, 2001
INVENTOR(S)     : Shigeki Okauchi et al.

It is certified that error appears in the above-identified patent and that said Letters Patent is hereby corrected as shown below:

<u>Title page,</u>
Item [75], the addresses for the inventors should read as follows:
-- Shigeki Okauchi, Tokyo, Japan
   Hitoshi Nabetani, Yokohama, Japan
   Taro Murakami, Tokyo, Japan --

<u>Column 5,</u>
Line 26, "52cfor" should read -- 52 c for --

<u>Column 9,</u>
Line 37, "claim 5," should read -- claim 9, --

Signed and Sealed this

Third Day of June, 2003

JAMES E. ROGAN
*Director of the United States Patent and Trademark Office*